(12) United States Patent
Breidenstein et al.

(10) Patent No.: US 11,859,137 B2
(45) Date of Patent: Jan. 2, 2024

(54) INTEGRATED SYSTEM OF BIOMASS TO RENEWABLE NATURAL GAS TO METHANOL, AND OTHER VALUE ADDED PRODUCTS

(71) Applicant: GAS TECHNOLOGIES LLC, Walloon Lake, MI (US)

(72) Inventors: Walter Breidenstein, Walloon Lake, MI (US); Randy D. Glad, Claremore, OK (US)

(73) Assignee: Gas Technologies LLC, Walloon Lake, MI (US)

( * ) Notice: Subject to any disclaimer, the term of this patent is extended or adjusted under 35 U.S.C. 154(b) by 53 days.

(21) Appl. No.: 17/531,579

(22) Filed: Nov. 19, 2021

(65) Prior Publication Data
US 2022/0154079 A1 May 19, 2022

Related U.S. Application Data

(60) Provisional application No. 63/115,805, filed on Nov. 19, 2020.

(51) Int. Cl.
*B01D 53/74* (2006.01)
*B01J 12/00* (2006.01)
*C10G 3/00* (2006.01)
*B01D 53/14* (2006.01)
*B01D 47/00* (2006.01)
*B01J 19/02* (2006.01)

(52) U.S. Cl.
CPC .............. *C10G 3/44* (2013.01); *B01D 47/00* (2013.01); *B01D 53/1468* (2013.01); *B01D 53/1475* (2013.01); *B01D 53/74* (2013.01); *B01J 12/002* (2013.01); *B01J 19/02* (2013.01); *C10G 3/60* (2013.01); *B01D 2253/108* (2013.01); *B01D 2257/504* (2013.01); *B01D 2257/708* (2013.01); *C10G 2300/1014* (2013.01); *C10G 2300/4006* (2013.01); *C10G 2300/44* (2013.01)

(58) Field of Classification Search
CPC .. B01J 12/002; B01J 19/24; B01J 2219/0894; B01J 2219/0896; B01J 2219/0898; B01D 53/74
See application file for complete search history.

(56) References Cited

U.S. PATENT DOCUMENTS

| | | | |
|---|---|---|---|
| 4,000,990 A * | 1/1977 | Bingham | ........... B01D 53/0476 95/103 |
| 4,681,612 A * | 7/1987 | O'Brien | ............... B01D 53/229 62/929 |
| 4,762,588 A | 8/1988 | Hirano et al. | |
| 7,456,327 B2 | 11/2008 | Pawlak et al. | |
| 7,578,981 B2 | 8/2009 | Pawlak et al. | |
| 7,642,293 B2 | 1/2010 | Pawlak et al. | |
| 7,687,669 B2 | 3/2010 | Pawlak et al. | |

(Continued)

*Primary Examiner* — Lessanework Seifu
(74) *Attorney, Agent, or Firm* — Brooks Kushman P.C.

(57) ABSTRACT

An integrated system for the conversion of biomass to renewable natural gas and then to methanol and other value-added products is provided. The integrated system includes a compressor that receives biomass gases from a biomass source and a series of purification stations that produce purified gas from the biomass gases. Characteristically, the purified gas has an enhanced amount of methane. A gas-to-liquids plant converts the purified gas to a product blend that includes methanol.

17 Claims, 5 Drawing Sheets

(56) References Cited

U.S. PATENT DOCUMENTS

| | | |
|---|---|---|
| 7,879,296 B2 | 2/2011 | Pawlak et al. |
| 7,910,787 B2 | 3/2011 | Pawlak et al. |
| 8,193,254 B2 | 6/2012 | Pawlak et al. |
| 8,202,916 B2 | 6/2012 | Pawlak et al. |
| 8,293,186 B2 | 10/2012 | Pawlak et al. |
| 9,255,051 B2 | 2/2016 | Gaffney et al. |

\* cited by examiner

INTEGRATED SYSTEM OF BIOMASS TO RENEWABLE NATURAL GAS TO METHANOL, AND OTHER VALUE ADDED PRODUCTS

CROSS-REFERENCE TO RELATED APPLICATIONS

This application claims the benefit of U.S. provisional application Ser. No. 63/115,805 filed Nov. 19, 2020, the disclosure of which is hereby incorporated in its(their) entirety by reference herein. 63/115,805

TECHNICAL FIELD

In at least one aspect, an integrated system and method for converting biomass to renewable natural gas and then to methanol and other value-added products is provided.

SUMMARY

In at least one aspect, an integrated system for the conversion of biomass to renewable natural gas and then to methanol and other value-added products is provided. The integrated system includes a compressor that receives biomass gases from a biomass source and a series of purification stations that produce purified gas from the biomass gases. Characteristically, the purified gas has an enhanced amount of methane. A gas-to-liquids plant converts the purified gas to a product blend that includes methanol.

In another aspect, a method and system for producing renewable liquid methanol and ethanol produced from a landfill, an ag digester, and WWTP biogas is provided.

In some aspects, a single-step gas-to-liquid (GTL) technology capable of converting renewable natural gas (RNG) into low carbon intensity (CI) renewable fuels via a direct methane conversion process that is 70% lower capital cost than its competitors is provided.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1:
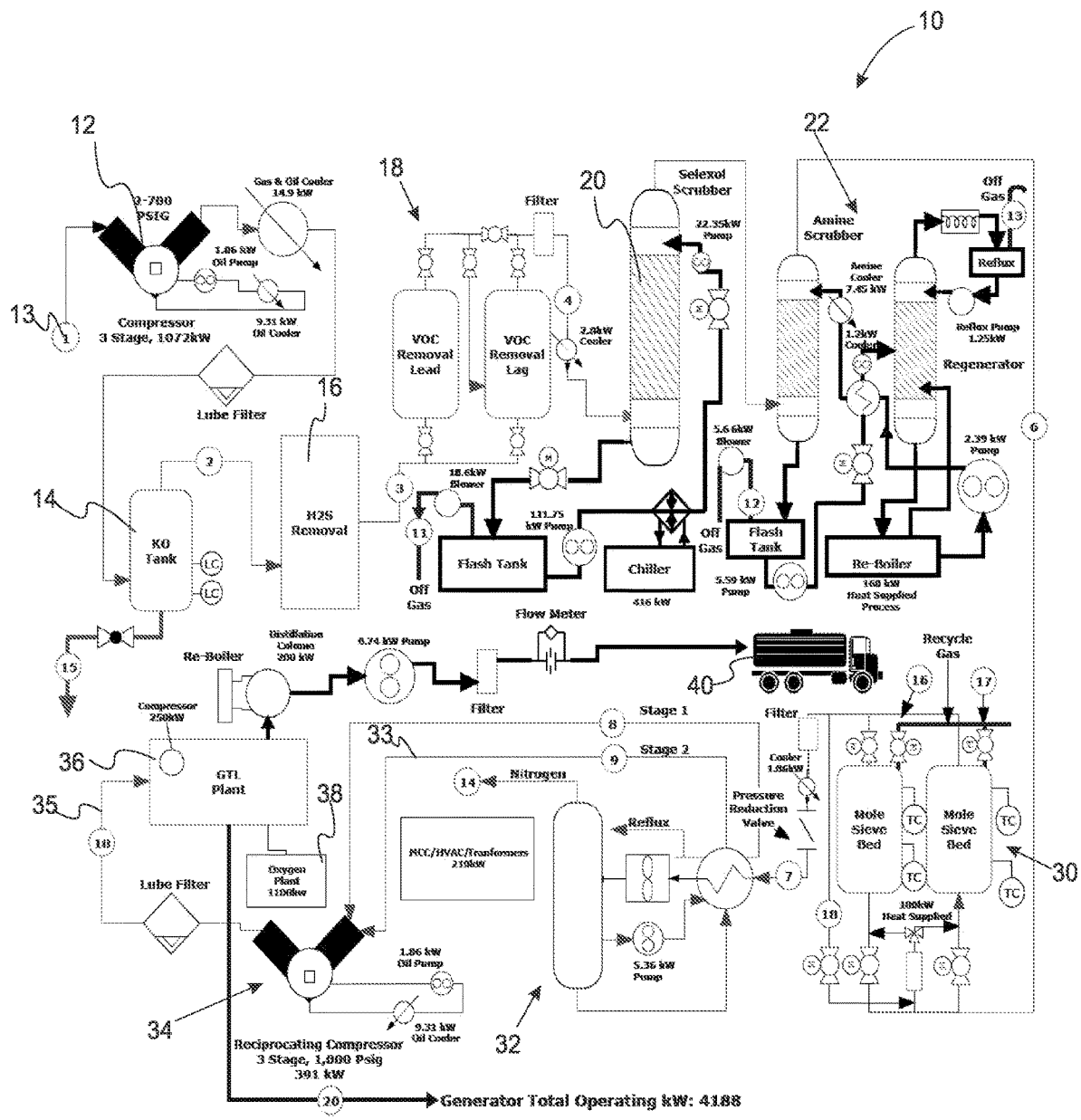
FIG. 1. Schematic of a system for biomass to renewable natural gas to methanol, DME, and hydrogen.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the ease of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

The term "one or more" means "at least one" and the term "at least one" means "one or more." The terms "one or more" and "at least one" include "plurality" and "multiple" as a subset. In a refinement, "one or more" includes "two or more."

ABBREVIATIONS

"ag" means agricultural.
"DHPO" means direct homogenous partial oxidation of methane to methanol.
"DME" means dimethyl ether.
"GLT" means gas-to-liquids.
"KO" means knockout.
"LNG" means liquified natural gas.
"RNG" means renewable natural gas.
VOC means volatile organic compounds.
"WWTP" means wastewater treatment plant.

Figure 2:
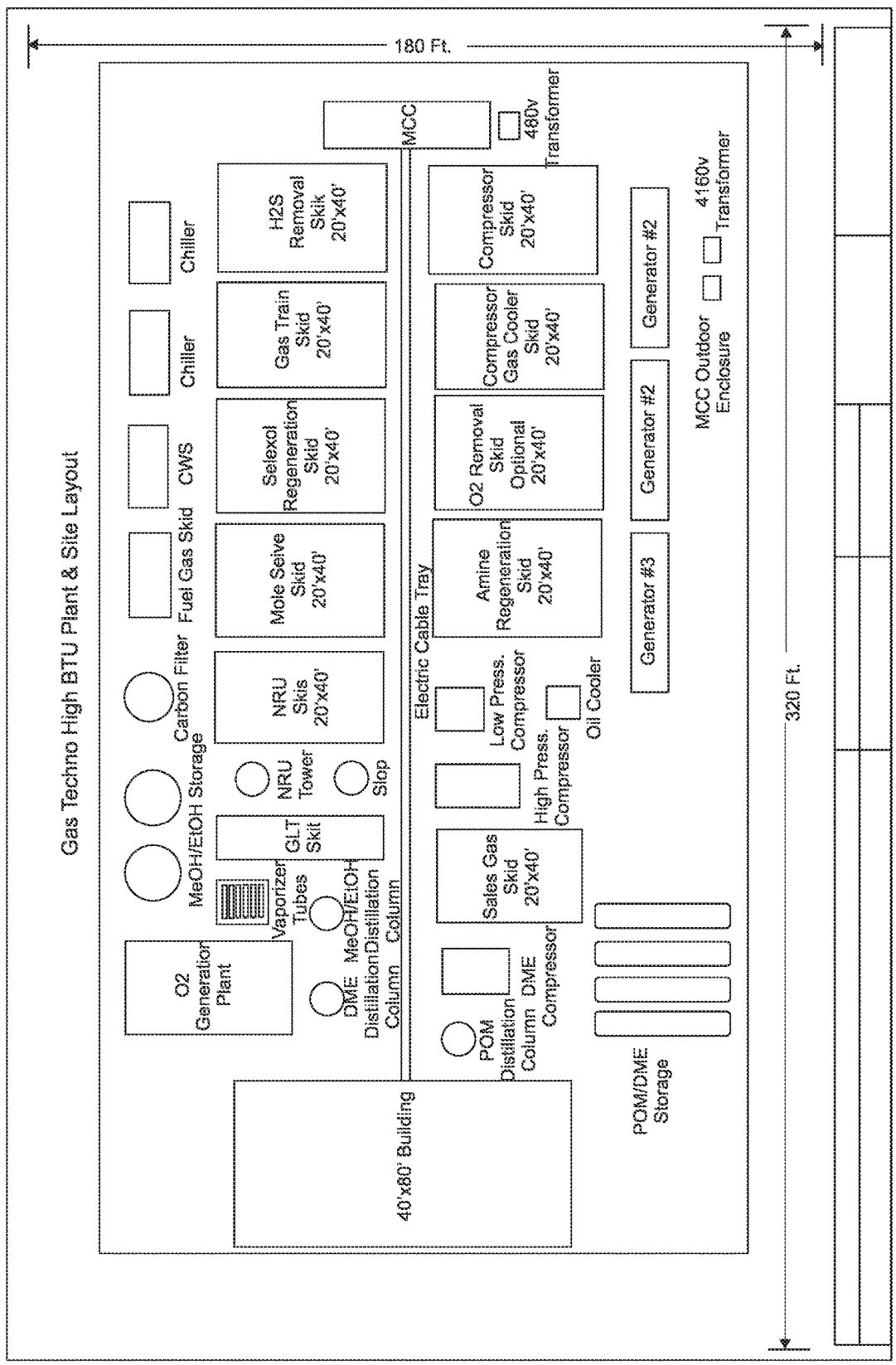
FIG. 2. Schematic of a high BTU plant and site layout implementing the system of FIG. 1.

FIG. 1 provides a schematic of an integrated system and method for converting biomass to renewable natural gas and then to methanol and other value-added products. FIG. 2 provides a schematic of an example of a site layout implementing the system of FIG. 1. Conversion system 10 includes a compressor 12 that receives gases (e.g., methane) from a source 13. Examples of sources include landfills, methane-rich biomass gas products of an ag digester, biomass gasification-derived methane-rich gas, municipal waste, and products of a wastewater treatment plant. In a refinement, the gases from source 13 are renewable gas derived from gasification of biomass such as corn stover and other agricultural residues such as rice straw, wheat straw, sugarcane bagasse or municipal wastes. The gaseous product is purified in a series of purification stations to enhance the amount of methane that will be provided to a GTL plant. Knockout tank 14 is in fluid communication with compressor 12 receiving gas therefrom. $H_2S$ removal station 16 receives gas from knockout tank 14 and removes hydrogen sulfide. VOC station 18 acts on the output gas from $H_2S$ removal station 16 to remove volatile organic compounds. VOC station 18 includes a VOC removal lead component and a VOC removal lag component which operate in an alternating manner in which the lead component actively removes VOCs while the lag component is regenerating. The roles of the lead and lag components between these two components alternate. Scrubber 20 then acts on the output gas from VOC station 18 to remove carbon dioxide and potentially additional hydrogen sulfide. The output gas from scrubber 20 is then passed to an amine scrubber 22 that can remove amines and additional carbon dioxide. Alternative, amine scrubber can be replaced with pressure swing adsorption for removing carbon dioxide and/or a carbon dioxide-removing membrane. The output gas from scrubber 20 is then passed through molecular sieve system 30 to remove additional impurities. Scrubber 20 can be a SELEXOL® based scrubber that uses a Selexol solvent which is a mixture of the dimethyl ethers of polyethylene glycol to remove carbon dioxide and hydrogen sulfide.

Still referring to FIG. 1, the series of purification stations includes a nitrogen removal system 32 that receives output gas from the molecular sieve system and removes at least a portion of nitrogen gas therein. Nitrogen removal system 32 receives the output gas from molecular sieve system 30 and removes at least a portion of the nitrogen gas therein. The output gas 33 from nitrogen removal system 32 is received by reciprocating compressor 34, which after compression to form output gas stream 35 is passed to GLT plant 36. GTL plant then output a product blend 40. The product blend 40 advantageously includes methanol and ethanol. In a refinement, the product blend can also include hydrogen ($H_2$), acetone, dimethyl ether, isopropanol, acetic acid, formic acid, formaldehyde, dimethoxymethane, 1,1 dimethoxyethane, methyl formate, methyl acetate, and water. In another refinement, includes 0 to 15 mole percent acetone, 30 to 99 mole percent methanol, 0 to 20 mole percent ethanol, 0.0 to 10 mole percent isopropanol, 0 to 1 mole percent acetic acid, 0 to 1 mole percent formic acid, 0 to 15 mole percent formaldehyde, and 1 to 30 mole percent water.

Figure 3:
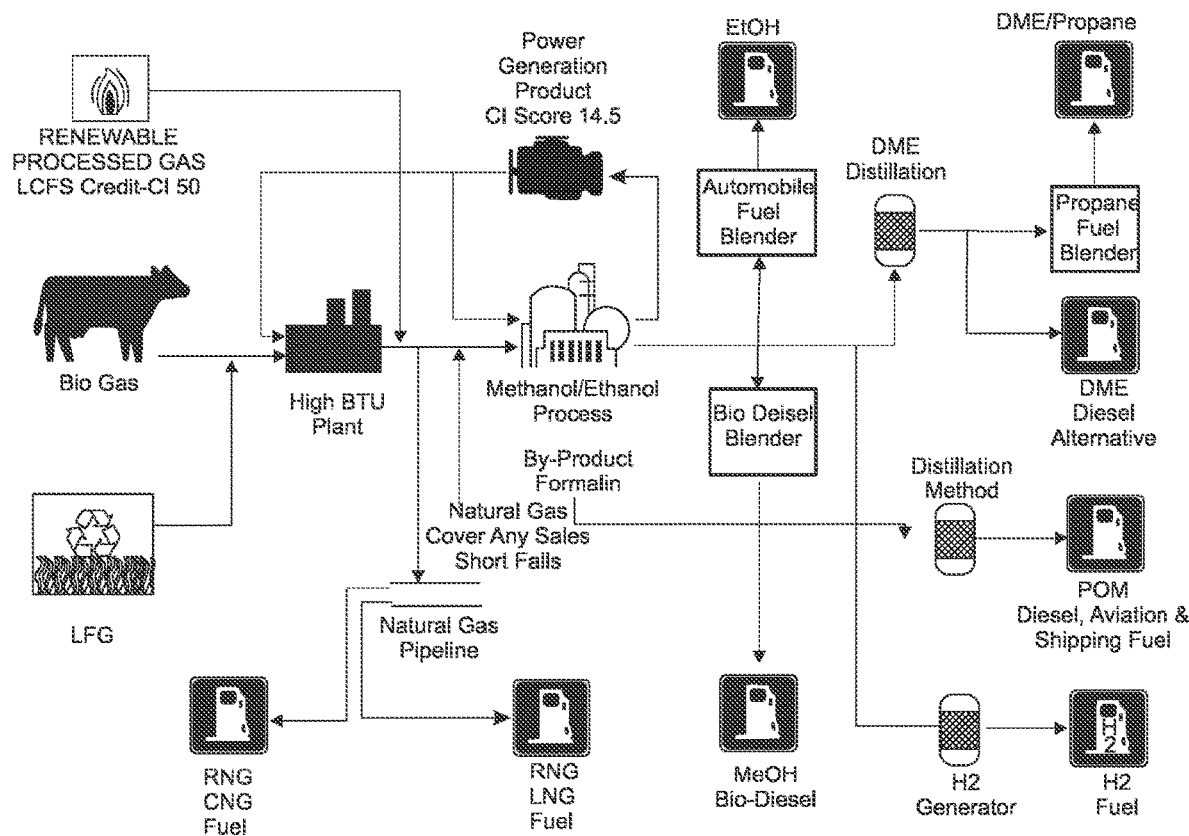
FIG. 3. Schematic of a potential revenue flow for the system of FIG. 1

Advantageously, the integrated system has a carbon intensity that is less than +100 at its highest range depending on feedstock, and more typically +20 and typically, less than +15, with some feedstocks showing CI score less than −250 when using Ag digester dairy and pig farm gas. FIG. 3 illustrates the potential revenue flow for the system of FIG. 1 from which a diversity of products can be produced, many of which are formed from GTL plant 36.

Figure 4:
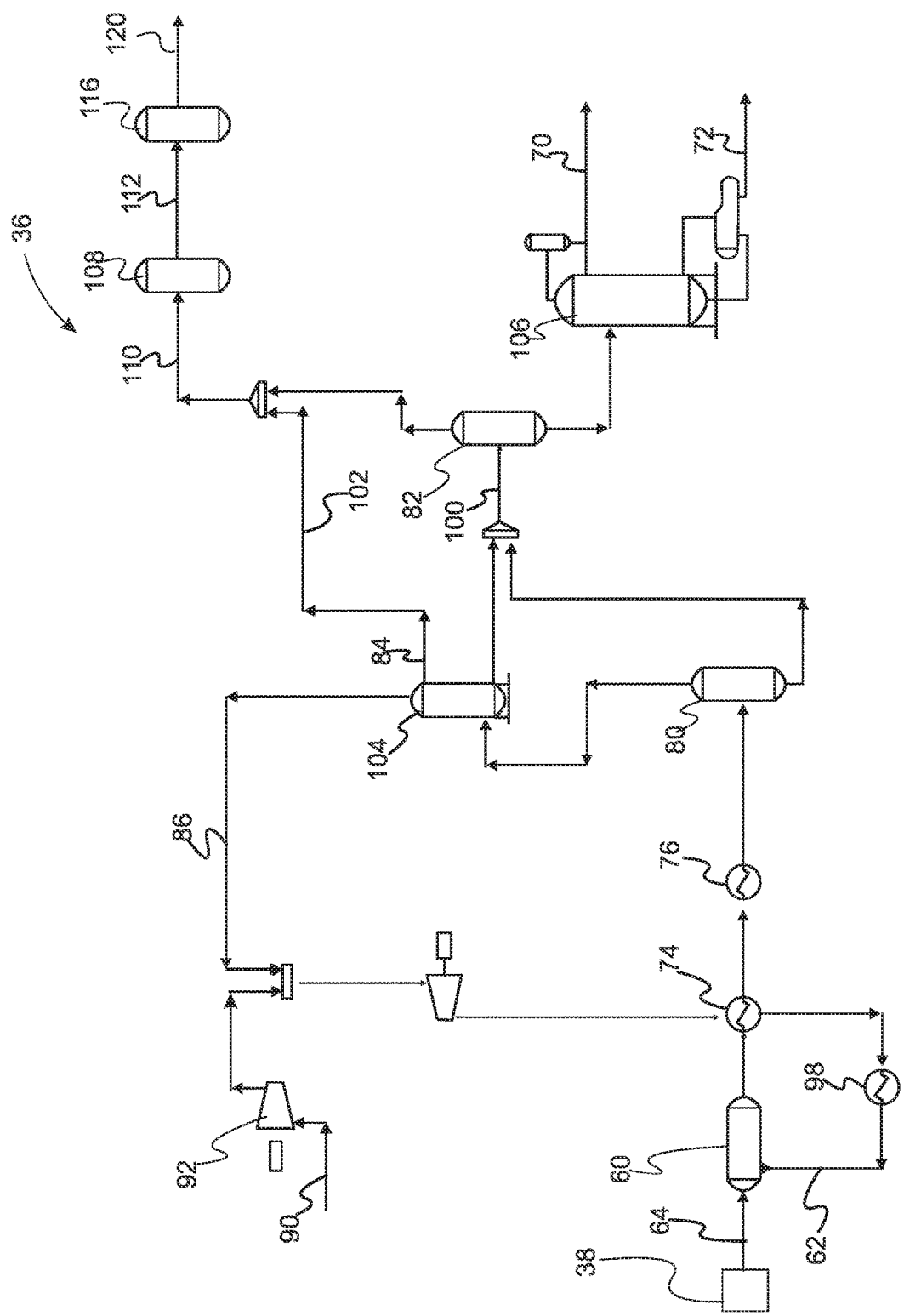
FIG. 4. Schematic of a GLT plant that can be used in the system of FIG. 1.

In a variation, GTL plant 36 can be the GLT system set forth in U.S. Pat. No. 9,255,051; the entire disclosure of which is hereby incorporated by reference. With reference to FIG. 4, a schematic illustration of GLI plant for converting gas stream 35 to oxygenated hydrocarbons, e.g., methanol, ethanol, formaldehyde, acetaldehyde, and the like, is provided. In a refinement, the apparatus functions in a continuous manner when in operation. Homogeneous direct partial oxidation is performed in a reactor 60, which is supplied with a hydrocarbon-containing gas 62 (and gas stream 35) and an oxygen-containing gas 64 from oxygen supply 38. In a refinement, the reaction is operated at pressures from about 450 to 1250 psia and temperatures from about 350 to 450° C. In particular, hydrocarbon-containing gas 62 and an oxygen-containing gas 64 react in a vessel to form a first product blend which is a blend (i.e., a mixture) of partially oxygenated compounds that include formaldehyde. In a refinement, the first product blend and/or output streams 70, 72 include $C_{1-10}$ alcohols and/or $C_{1-5}$ aldehydes. In another refinement, the first product blend and/or output streams 70, 72 include an alcohol selected from the group consisting of methanol, ethanol, propanols, butanols, pentanols, and combinations thereof, and/or aldehyde selected from the group consisting formaldehyde, acetaldehyde, propionaldehyde and combinations thereof. In another refinement, the first product blend and/or output streams 70, 72 include an alcohol selected from the group consisting of methanol, ethanol, and combinations thereof and aldehyde selected from the group consisting formaldehyde, acetaldehyde, and combinations thereof. Examples of systems and methods of performing the partial oxidation as set forth in U.S. Pat. Nos. 8,293,186; 8,202,916; 8,193,254; 7,910,787; 7,687,669; 7,642,293; 7,879,296; 7,456,327; and 7,578,981; the entire disclosures of which are hereby incorporated by reference. In a refinement, the hydrocarbon-containing gas includes $C_{1-10}$ alkanes. In another refinement, the hydrocarbon-containing gas includes an alkane selected from the group consisting of methane, ethane, propanes, butanes, pentanes, and combinations thereof. In another refinement, the hydrocarbon-containing gas includes an alkane selected from the group consisting of methane, ethane, and combinations thereof. Examples of oxygen-containing gas include molecular oxygen, which may be in the form of concentrated oxygen or air. In a refinement, the oxygen-containing gas stream is made oxygen-rich (e.g., by passing air through a membrane to increase oxygen content). The low conversion and selectivity of homogeneous direct partial oxidation requires that a recycle loop is utilized to increase the overall carbon efficiency.

Following partial oxidation reaction, the reactant stream is rapidly cooled in a series of heat exchangers 74 and 76 to prevent decomposition of the produced oxygenates. The heat energy transferred by exchanger 76 might optionally be used to provide energy that may be used in the creation of synthesis gas. After cooling, the liquids are separated from the gas stream as station 102. The gas stream is then submitted to a separation process for removal of non-hydrocarbon fractions a station 80, which may be performed via scrubbing, membrane separation, adsorption processes, cryogenic separations, or by purging a small gas fraction. If station 80 is a liquid scrubbing system, liquid products are sent to a flash drum 82 where dissolved gases are removed. Non-hydrocarbon gases 84 are removed from the recycle loop, and the hydrocarbon gases 86 are then recycled to combine with fresh hydrocarbon gas stream 35 (e.g., a purified methane-containing stream) from the system of FIG. 1, which has been pressurized to the pressure of the loop by compressor 92. The stream composed of recycled hydrocarbons plus fresh methane gas is pressurized to make up for pressure losses in the recycle loop, preheated via the cross exchanger 74 and further by the preheater 98, when necessary to meet the desired reaction conditions.

Liquids generated by the gas-to-chemicals process are composed predominantly of alcohols and aldehydes (e.g., methanol, ethanol, and formaldehyde) as set forth above. The raw liquid stream 100 generated by the GTL process is generally composed of 50-70% alcohols and 5-20% aldehydes 15-30% water. Downstream processing of these liquids may include a number of different synthesis routes to higher-value chemicals and fuels, but a simple distillation of alcohols from aldehydes is performed in a simple fractional distillation column 106 in which alcohols are recovered in the distillate 70 and the aqueous aldehyde solution from the column bottoms 72.

The compositions of the streams 84 obtained from the separation of non-hydrocarbon gases from the recycle loop and from degassing the liquid mixture 102 may vary significantly depending on the separation methods employed in station 104. Stream 102 would be typically be needed to regenerate a scrubbing fluid by liberating dissolved gasses such as carbon dioxide or carbon monoxide, which would be enriched in this stream. Stream 102 is composed predominantly of lighter hydrocarbons and carbon oxides (e.g., $CO_2$ and/or) which are soluble in the liquid solution but are vaporized when decreasing the pressure.

Stream 102 may or may not be blended with stream 84, depending on the needs of the synthesis gas reactor 108. Stream 84 is a separated gas stream from station 105 such might be separated from a purge stream, membrane, cryogenic, or adsorption process. Although stream 84 would be enriched in non-hydrocarbon gasses, there would be some light alkanes present as well. A simple purge method in station 104 results in hydrocarbon fractions that may reach up to 70%, while selective removal techniques tend to preserve hydrocarbons in the recycle loop 2. Stream 84 and 102 are blended to form stream 110, which is rich in synthesis gas.

Stream 110 goes through reactor 108, which converts the hydrocarbon portion to synthesis gas in stream 112. Stream 112 then goes on to react with liquid streams in reactor 109 (for example, output streams 70 or 72). Stream 72 is the bottoms product of distillation column 106 and would contain low volatility, high boiling components such as formalin, heavy alcohols, and some acids. Stream 70 is the overhead from distillation column 106 and would be rich in the higher volatility low boiling components such as light alcohols. Streams 112 and said liquid product streams would then react to form oxygenates of a carbon number greater than that in the liquid reactant stream. Such oxygenates produced by reactor 116 might include esters such as formates and DMC, or carboxylic acids from a CO-rich synthesis gas in stream 112. Higher alcohols and aldehydes from mixed alcohol synthesis, alcohol homologation, and aldehyde synthesis can form from a relatively hydrogen-rich synthesis gas in stream 112. As mentioned, stream 72 contains aqueous formaldehyde, which is known to react with synthesis gas to form glycolic acid and glycolaldehyde. In another refinement, the synthetic gas is generated by a pyrolysis reaction or generated externally and blended with stream 17. In a further refinement, the pyrolysis reaction generates light alkanes in addition to synthetic gas.

Alternatively, stream 112 may react with itself in reactor 116 and form light alkanes (e.g., $C_{1-4}$ alkanes) for use as a feed gas to be blended with gas stream 35. The light alkane product of this reaction would typically be rich in $C_2$+ hydrocarbons, which are known to produce a distribution of alcohols with a higher molecular weight when compared to methane under homogenous partial oxidation conditions. Certain catalysts are also known to produce both alcohols and light alkanes. In addition, stream 112 may be blended with externally produced synthesis gas to produce a gas mixture in reactor 116 which can be utilized by reactor 60. This feature allows for feedstock flexibility in the direct homogenous partial oxidation process. In another variation, the synthesis gas is generated in reactor 108 by implementing steam, dry, or tri-reforming reaction. In a refinement, the tri-reforming reaction is assisted by energy (e.g., it uses the heat) recovered from a heat exchanger 76.

In one embodiment, DHPO gas rejected by a DHPO recycle loop is used to produce syngas in reactor 108. The syngas further reacts to produce both oxygenates and light alkanes in reactor 116. The conversion may be effected using a suitable catalyst, for example, an actinide/lanthanide modified catalyst as described in U.S. Pat. No. 4,762,588; the entire disclosure of which is hereby incorporated by reference. DHPO Oxygenate products may be separated from light alkanes using any simple liquid separation system well-known in the art. The separated alkanes may then be blended with the feed gas in stream 35 following nitrogen removal, if necessary.

In another embodiment, in a DHPO system comprising a synthesis gas, the gas may be separated in the recycle system using one or more membranes alkanes such as might be found with station 104. Many membrane materials lack sufficient selectivity to completely separate non-hydrocarbon such as nitrogen and carbon dioxide from hydrocarbon streams. In this configuration, the light alkanes can be present in the permeate or retentate streams of the membrane. Using well known techniques, this stream would be converted into synthesis gas. Hydrogen and carbon dioxide may optionally be separated from this synthesis gas in stream 112 by a membrane or scrubbing system prior to reactor 116 to make a stream rich in CO, which could then be used in carbonylation and carbon insertion reactions in reactor 116. The hydrogen may optionally be used to further reduce the carbonylated species. Alternatively, syngas is known to react directly with alcohols and form higher alcohols, esters, or aldehydes.

In another embodiment, some of the light alkanes present in stream 110 may be thermally decomposed to provide hydrogen and carbon black in reactor 108. This thermal decomposition may be assisted by a heat exchanger 76. The carbon black could either be partially combusted in oxygen to yield pure carbon monoxide or reacted with the carbon dioxide to yield carbon monoxide. This pure carbon monoxide can then be used as a reactant in carbonylation or carbon insertion reactions in reactor 116. The hydrogen may optionally be used to further reduce the carbonylated species present in stream 120 after reactor 116.

Further to the previous embodiment, an external carbon source may be utilized to react with carbon dioxide to yield carbon monoxide in either a catalytic or non-catalytic process assisted by heat recovered by heat exchanger 76. The carbon monoxide may then be reacted with oxygenates in carbon insertion or carbonylation reactions in a manner consistent with the previous embodiment.

Figure 5:
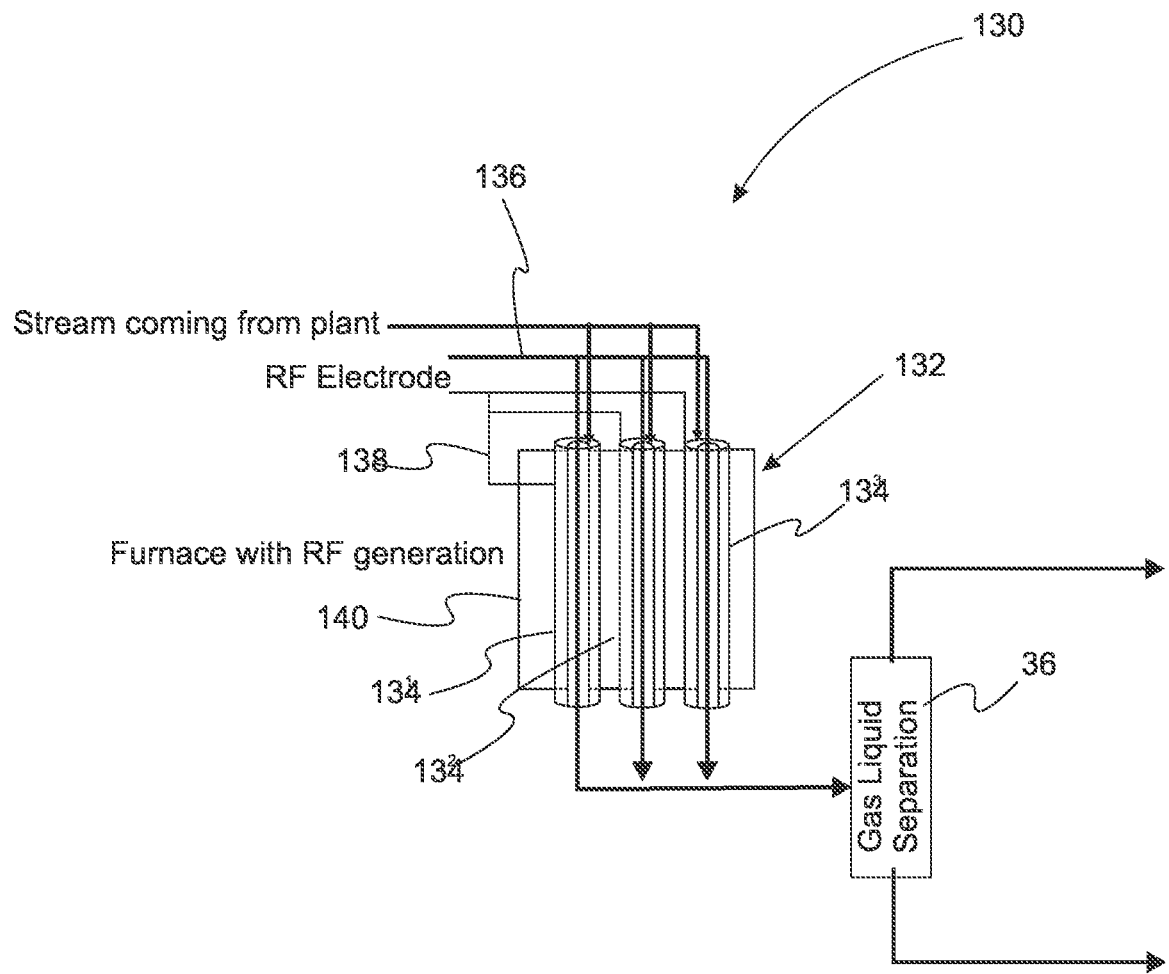
FIG. 5. Multi-tubular plasma reactor having a $CO_2$ separation design.

In another variation, the carbon dioxide by-products produced above and be collected and converted to use products. An example of a plasma reactor system that can be used to process carbon dioxide is provided in U.S. provisional Pat. No. 63/177,040, filed Apr. 20, 2021; the entire disclosure of which is hereby incorporated by reference. Referring to FIG. 5, a schematic of a multi-tubular plasma reactor system for $CO_2$ separation is provided. In a refinement, carbon dioxide by-products from the off gas lines of the VOC removal system and/or the amine scrubber 22 (or the PSA system or membrane) and/or the carbon dioxide output of the GTL system of FIG. 4 are provided to a plasma reactor system 120 for highly economical and efficient production of high purity ethanol.

Stilt referring to FIG. 5, plasma reactor system 130 includes a plurality 132 of dielectric barrier discharge plasma reactors $134^i$ where i is an integer label for each reactor. Characteristically, the dielectric barrier discharge plasma reactors are adapted to receive a plasma feed gas from an industrial reactor and output ethanol. In a refinement, each dielectric barrier discharge plasma reactor can include 2-4 cm quartz or other inert reactor tubes of lengths between 5 and 50 cm. In a refinement, each DBD plasma reactor $134^i$ is packed with a transition metal oxide catalyst. The catalyst can include a transition metal, either supported or unsupported. The supports can include one metal oxide or a mixture of metal oxides. In a refinement, supports are oxides of p-block elements of the periodic table or hybrids such as zeolites, hydrotalcites or phosphor-silicates, activated carbon, and carbon nanotubes. Oxide supports may be acidic, neutral, or basic. Catalyst support with either oxygen storage capability or exhibiting redox property such as $CeO_2$ can also be used. Different loading of metal and supports weight ratios can be used for specific applications. In a refinement, the catalysts are promoted with metal promoters or unpromoted. In a refinement, a weight ratio of transition metal to support is from 0.1 to 100.

A plasma in reactors can be thermally and/or non-thermally generated. Sources of power can be from both non-renewable or renewable sources such as methane, associated gases, nitrogen, carbon dioxide, wind, solar, hydro, nuclear, or a combination thereof. In a refinement, each plasma dielectric barrier discharge plasma reactors $134^i$ includes a pair of electrodes 136 and 138 for generating the RF plasma. For the plasma generation, multiple electrodes made of conduction metals such as stainless steel and a negative power supply of 5-50 kV with a rectifier can be used.

In refinement, plasma reactor system 130 includes furnace 140 for heating the plurality 132 of dielectric barrier discharge (DBD) plasma reactors $134^i$. The reactors can be heated with clamp-shale furnace power with non-renewable or renewable electric sources. Alternatively, power produced at the site can also be used for heating the furnace. It should be appreciated that each reactor can be plasma generated with heating therein.

For scale-up of the reactor configuration, a liner approach in parallel or series can be used that is already adapted in the industry. Therefore, a multi-tubular reactor system having 1-50 reactors is used for converting 60 m$^3$/h ($5.08 \times 10^{-2}$ MMSCFD) gas (e.g., $CO_2$) can be converted to high purity ethanol. Each tube can be loaded with 1 to 10 g of the catalyst. The catalyst can be reduced with a gas comprising of pure hydrogen or hydrogen gas diluted in an inert gas such as Ar, $N_2$, or He, which can be used. Also, other reducing gas such as CO may be used for the reduction of the catalyst prior to the plasma application. The rate of production of ethanol is about 1-10 µmol gcat$^{-1}$ h$^{-1}$ per tube.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An integrated system comprising
    a compressor that receives biomass gases from a biomass source;
    a series of purification stations that produce a purified gas from the biomass gases, the purified gas having an enhanced amount of methane, and a gas-to-liquids plant that converts the purified gas to a product blend that includes methanol; and
    a plasma reactor system for producing ethanol from carbon dioxide that is a by-product, the plasma reactor system including one or more dielectric barrier discharge plasma reactors, each dielectric barrier discharge plasma reactor being packed with a transition metal oxide catalyst wherein the dielectric barrier discharge plasma reactors are adapted to receive carbon dioxide from the integrated system.

2. The integrated system of claim 1, wherein the biomass source includes landfills, an ag digester, biomass gasification derived methane-rich gas, municipal waste, and a wastewater treatment plant.

3. The integrated system of claim 1, Wherein the series of purification stations includes a knockout tank that receives gas from the compressor.

4. The integrated system of claim 3, wherein the series of purification stations includes a $H_2S$ removal station that receives gas from the knockout tank and removes hydrogen sulfide.

5. The integrated system of claim 4, wherein the series of purification stations includes a VOC station that acts on an output gas from $H_2S$ removal station (16) to remove volatile organic compounds.

6. The integrated system of claim 5, wherein the series of purification stations includes a scrubber that acts on the output gas from the VOC station to remove carbon dioxide and potentially additional hydrogen sulfide.

7. The integrated system of claim 6, wherein the series of purification stations includes an amine scrubber that receives the output gas from the scrubber that can remove amines and additional carbon dioxide.

8. The integrated system of claim 7, wherein the series of purification stations includes a molecular sieve system that receives output gas from the amine scrubber to remove additional impurities.

9. The integrated system of claim 8, wherein the series of purification stations includes a nitrogen removal system that receives output gas from the molecular sieve system and removes at least a portion of nitrogen gas therein.

10. The integrated system of claim 9, wherein the series of purification stations includes a reciprocating compressor that receives output gas from the nitrogen removal system and then, after compression, passes the gas to the gas-to-liquids plant.

11. The integrated system of claim 1, wherein the transition metal oxide catalyst includes a transition metal that is either supported or unsupported.

12. The integrated system of claim 11, wherein the transition metal oxide catalyst includes a catalyst support.

13. The integrated system of claim 12, wherein the catalyst support includes a component selected from the group consisting of metal oxides, zeolites, hydrotalcites or phosphor-silicates, activated carbon, carbon nanotubes, and combinations thereof.

14. The integrated system of claim 12, wherein the catalyst support exhibits oxygen storage capacity and/or redox properties.

15. The integrated system of claim 12, wherein a weight ratio of transition metal to support is from 0.1 to 100.

16. The integrated system of claim 1, wherein a plasma is generated in each plasma reactor thermally or non-thermally generated.

17. The integrated system of claim 1, wherein each plasma reactor of the plurality includes a pair of electrodes for generating an RF plasma.

* * * * *